(12) United States Patent
Hanks et al.

(10) Patent No.: US 9,581,479 B2
(45) Date of Patent: Feb. 28, 2017

(54) ULTRASONIC METER FLOW MEASUREMENT MONITORING SYSTEM

(71) Applicant: Western Energy Support & Technology, Inc., Cheyenne, WY (US)

(72) Inventors: Ed Hanks, Hammond, LA (US); Aaron Kruger, Thornton, IA (US); John Lansing, Houston, TX (US); Laura Lawton, Lafayette, LA (US); Rick Tompkins, Neederland, TX (US)

(73) Assignee: Western Energy Support and Technology, Inc., Cheyenne, WY (US)

( * ) Notice: Subject to any disclaimer, the term of this patent is extended or adjusted under 35 U.S.C. 154(b) by 736 days.

(21) Appl. No.: 14/058,815

(22) Filed: Oct. 21, 2013

(65) Prior Publication Data

US 2014/0303909 A1 Oct. 9, 2014

Related U.S. Application Data

(60) Provisional application No. 61/809,542, filed on Apr. 8, 2013.

(51) Int. Cl.

| | | |
|---|---|---|
| *G01F 1/68* | (2006.01) | |
| *G01F 25/00* | (2006.01) | |
| *G01F 1/66* | (2006.01) | |
| *G01F 1/86* | (2006.01) | |
| *G01F 15/02* | (2006.01) | |
| *G01F 15/04* | (2006.01) | |

(52) U.S. Cl.
CPC ............... *G01F 1/68* (2013.01); *G01F 1/66* (2013.01); *G01F 1/86* (2013.01); *G01F 15/024* (2013.01); *G01F 15/046* (2013.01); *G01F 25/003* (2013.01); *G01F 25/0007* (2013.01)

(58) Field of Classification Search
CPC ....................................................... G01F 1/68
USPC .......................................................... 702/47
See application file for complete search history.

(56) References Cited

U.S. PATENT DOCUMENTS

| | | | |
|---|---|---|---|
| 5,226,728 | A | 7/1993 | Vander Heyden |
| 5,504,693 | A | 4/1996 | Elliott et al. |
| 6,978,210 | B1 | 12/2005 | Suter et al. |
| 7,049,975 | B2 | 5/2006 | Vanderah et al. |
| 7,263,459 | B2 | 8/2007 | Ito et al. |

(Continued)

*Primary Examiner* — Bryan Bui
(74) *Attorney, Agent, or Firm* — Burr & Forman LLP; Harvey S. Kauget (57) ABSTRACT

The present invention provides an automated meter station monitoring system for a fluid comprising a processor having algorithms for verifying performance of a fluid flow measurement system. A pressure sensor is operatively connected to the processor to measure the pressure of the fluid. A temperature sensor is operatively connected to the processor to measure the temperature of the fluid. A gas chromatograph is operatively connected to the processor to monitor changes in gas composition and chromatograph response factors of the fluid. An ultrasonic meter is operatively connected to the processor to monitor the velocity of the fluid, speed of sound of the fluid, and meter diagnostics. A flow computer is operatively connected to the processor to record pressure of the fluid, record temperature of the fluid, record gas composition of the fluid, calculate compressibility ratio of the fluid, calculate standard flow rate of the fluid, and calculate energy rate of the fluid.

23 Claims, 3 Drawing Sheets

(56) References Cited

U.S. PATENT DOCUMENTS

| | | |
|---|---|---|
| 7,705,747 B2 | 4/2010 | Twitchell, Jr. |
| 7,830,273 B2 | 11/2010 | Twitchell, Jr. |
| 8,027,793 B2 | 9/2011 | Ellender et al. |
| 8,076,928 B2 | 12/2011 | Nunally |
| 2009/0322544 A1 | 12/2009 | McDowell |
| 2010/0217531 A1 | 8/2010 | Day |
| 2012/0059591 A1 | 3/2012 | Guglielmo |
| 2014/0111342 A1* | 4/2014 | Ramsay .................. G01F 1/662 340/606 |

* cited by examiner

ULTRASONIC METER FLOW MEASUREMENT MONITORING SYSTEM

CROSS REFERENCES TO RELATED APPLICATIONS

This application claims priority from and is related to commonly owned U.S. Provisional Patent Application Ser. No. 61/809,542 filed Apr. 8, 2013, entitled: Ultrasonic Meter Flow Measurement Monitoring System, this Provisional Patent Application incorporated by reference herein.

BACKGROUND OF THE INVENTION

A fluid flow process includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g., paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of single and/or multiphase fluids in an industrial flow process. Such physical parameters include, for example, volumetric flow rate, composition, consistency, density, and mass flow rate.

It is an object of the present invention is to provide an automated meter station monitoring system for a fluid comprising: a processor having algorithms for verifying performance of a fluid flow measurement system; a pressure sensor operatively connected to said processor, said pressure sensor measuring the pressure of the fluid; a temperature sensor operatively connected to said processor, said temperature sensor measuring the temperature of the fluid; a gas chromatograph operatively connected to said processor, said gas chromatograph monitoring changes in gas composition and chromatograph response factors of the fluid; an ultrasonic meter operatively connected to said processor, said ultrasonic meter monitoring velocity of the fluid, speed of sound of the fluid, and meter diagnostics; and a flow computer operatively connected to said processor, said flow computer recording pressure of the fluid, recording temperature of the fluid, recording gas composition of the fluid, calculating compressibility ratio of the fluid, calculating standard flow rate of the fluid, and calculating energy rate of the fluid.

It is a another object of the present invention is to provide a method for automated monitoring of a fluid comprising: providing a processor having algorithms for verifying the performance of a fluid flow measurement system; providing a pressure sensor operatively connected to said processor, said pressure sensor measuring the pressure of the fluid; providing a temperature sensor operatively connected to said processor, said temperature sensor measuring the temperature of the fluid; providing a gas chromatograph operatively connected to said processor, said gas chromatograph monitoring changes in gas composition and chromatograph response factors of the fluid; providing an ultrasonic meter operatively connected to said processor, said ultrasonic meter monitoring velocity, speed of sound of the fluid, and meter diagnostics; and providing a flow computer operatively connected to said processor, said flow computer recording pressure of the fluid, recoding temperature of the fluid, and recording gas composition of the fluid; calculating compressibility ratio of the fluid through said flow computer; calculating standard flow rate of the fluid through said flow computer; and calculating energy rate of the fluid through said flow computer.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

A feature of the present invention is to provide an automated meter station monitoring system for a fluid comprising a processor having algorithms for verifying performance of a fluid flow measurement system. A pressure sensor is operatively connected to the processor to measure the pressure of the fluid. A temperature sensor is operatively connected to the processor to measure the temperature of the fluid. A gas chromatograph is operatively connected to the processor to monitor changes in gas composition and chromatograph response factors of the fluid. An ultrasonic meter is operatively connected to the processor to monitor the velocity of the fluid, speed of sound of the fluid, and meter diagnostics. The ultrasonic meter can further comprise an array of ultrasonic transducers and receivers for producing fluid velocity measurements of the fluid and fluid speed of sound measurements of the fluid. A flow computer is operatively connected to the processor to record pressure of the fluid, record temperature of the fluid, record gas composition of the fluid, calculate compressibility ratio of the fluid, calculate standard flow rate of the fluid, and calculate energy rate of the fluid. The ultrasonic meter can further comprise a digital output signal that is read as a digital input signal to the monitoring system. The automated meter station monitoring system can further comprise a diagnostic alarm that alarms based on performance of the ultrasonic meter. The automated meter station monitoring system can further comprise a speed of sound alarm that alarms based on difference between measured speed of sound of the fluid and calculated speed of sound of the fluid. The automated meter station monitoring system can further comprise a flow rate alarm that alarms based on difference between calculated flow rate of the fluid by the flow computer and calculated flow rate of the fluid by the monitoring system. The automated meter station monitoring system can further comprise a static pressure alarm that alarms based on difference between measured static pressure of the fluid recorded by the flow computer and measured static pressure of the fluid recorded by the monitoring system. The automated meter station monitoring system can further comprise a flowing temperature alarm that alarms based on difference between flowing temperature of the fluid recorded by the flow computer and calculated flowing temperature of the fluid recorded by the monitoring system.

Another feature of the present invention is to provide a method for automated monitoring of a fluid. The method comprising a processor that is provide with algorithms for verifying the performance of a fluid flow measurement system. A pressure sensor that is provided to operatively connect to the processor for measuring the pressure of the fluid. A temperature sensor that is provided to operatively connect to the processor for measuring the temperature of the fluid. A gas chromatograph that is provided to operatively connect to the processor for monitoring changes in gas composition and chromatograph response factors of the fluid. An ultrasonic meter that is provided to operatively connect to the processor for monitoring velocity of the fluid, speed of sound of the fluid, and meter diagnostics. A flow computer that is provided to operatively connect to the processor for recording pressure of the fluid, recoding temperature of the fluid, and recording gas composition of the fluid. A calculation of the compressibility ratio of the fluid is performed through the flow computer. A calculation of the standard flow rate of the fluid is performed through the flow computer. A calculation of the energy rate of the fluid is performed through the flow computer. The method can further comprise the steps of polling the ultrasonic meter for individual path velocities of the fluid; calculating a calculated average fluid velocity of the fluid from the ultrasonic meter using an algorithm; and monitoring difference between an outputted fluid velocity of the fluid from the ultrasonic meter and the calculated average velocity of the fluid. The method can further comprise the steps of polling the ultrasonic meter for an average fluid velocity of the fluid and the actual flow rate of the fluid; calculating a calculated actual flow rate of the fluid using the average fluid velocity of the fluid from the ultrasonic meter and a meter diameter; and monitoring difference between an actual flow rate of the fluid from the ultrasonic meter and the calculated actual flow rate of the fluid. The method can further comprise the steps of polling the ultrasonic meter for an actual flow rate of the fluid; and monitoring difference between the actual flow rate of the fluid registered in the ultrasonic meter and the actual flow rate calculated by the fluid in the flow computer. The method can further comprise the steps of polling the flow computer for a pressure measurement used by the flow computer in the standard flow rate calculation of the fluid; polling the flow computer for a temperature measurement used by the flow computer in the standard flow rate calculation of the fluid, and monitoring difference between the pressure registered by the flow computer and the temperature registered by the flow computer compared to the pressure measured by the pressure sensor and the temperature measured by the temperature sensor recorded by the monitoring system. The method can further comprise the steps of polling the chromatograph for the gas composition of the fluid; polling the flow computer for a pressure of the fluid; polling the flow computer for a temperature of the fluid; calculating compressibility ratio using pressure of the fluid, temperature of the fluid and gas composition of the fluid polled from the flow computer; and monitoring difference between the flow computer calculated compressibility ratio of the fluid and the monitoring system calculated compressibility ratio of the fluid. The method can further comprise the steps of polling the flow computer for an actual flow rate of the fluid; polling the flow computer for a pressure of the fluid; polling the flow computer for a temperature of the fluid; polling the flow computer for a compressibility ratio of the fluid; polling the flow computer for a standard flow rate of the fluid; recalculating a calculated standard flow rate of the fluid using pressure of the fluid, temperature of the fluid, compressibility ratio of the fluid and the actual flow rate of the fluid polled from the flow computer; and monitoring difference between a standard flow rate of the fluid calculated by the flow computer and a calculated standard flow rate of the fluid calculated by the monitoring system. The method can further comprise the steps of polling the gas chromatograph for a heating value of the fluid; polling the flow computer for a standard flow rate of the fluid; polling the flow computer for an energy flow rate of the fluid; calculating a calculated energy flow rate of the fluid by multiplying the standard flow rate of the fluid by the heating value of the fluid; and monitoring difference between the calculated energy flow rate of the fluid by the flow computer and the energy flow rate of the fluid calculated by the monitoring system. The method can further comprise the steps of polling the ultrasonic meter for an average speed of sound of the fluid; polling the chromatograph for a gas composition of the fluid; polling the flow computer for a pressure of the fluid; polling the flow computer for a temperature of the fluid; calculating an average speed of sound of the fluid using the pressure of the fluid, temperature of the fluid and gas composition of the fluid; and monitoring difference between the average speed of sound of the fluid reported by the ultrasonic meter and the speed of sound of the fluid calculated by the monitoring system. The method can further comprise the steps of polling the ultrasonic meter for diagnostic information, said diagnostic information having path velocity ratios of the fluid, path turbulence levels of the fluid, and path speed of sound relationships of the fluid; and monitoring the path velocity ratios of the fluid, path turbulence levels of the fluid, path speed of sound relationships of the fluid, and the speed of sound difference of the fluid to detect conditions causing measurement uncertainty. The method can further comprise the steps of polling the chromatograph for response factors; and monitoring changes in response factors over time. The method can further comprise the steps of polling the ultrasonic meter for a metrological checksum; and monitoring value of the metrological checksum for changes.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Similar reference characters refer to similar parts throughout the several views of the drawings.

DETAILED DESCRIPTION OF THE INVENTION

Definitions

Figure 1:
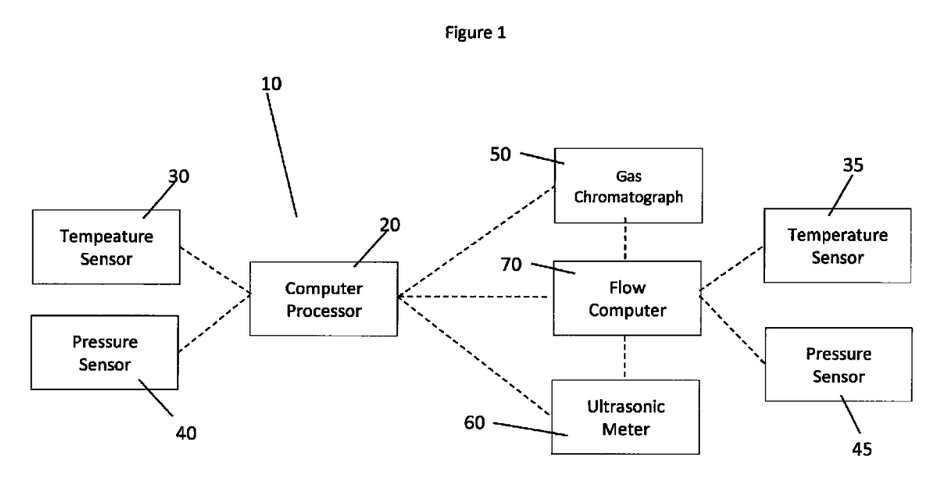
FIG. 1 is a schematic view of a stand-alone embodiment of the present invention.

Average Fluid Velocity $V_{avg} = f(v_1, v_2, v_3, \ldots v_x)$

Where $v_1 \ldots v_x$ are path velocity measurements produced by an ultrasonic meter. The number of path velocities is a function of the meter manufacturer Path Velocity Ratios $v_x/V_{avg}$ where $v_x$ can be any of the path velocity measurements. Path velocity ratios also include specific combinations of path velocities that describe the fluid flow such as the profile, symmetry, swirl, and cross flow ratios. Each ratio is a function of the particular ultrasonic meter path configuration Path Turbulence levels $\text{stdev}(v_1) \ldots \text{stdev}(v_x)$ where $v_1 \ldots v_x$ are path velocity measurements Actual Flow Rate $Q_a = V_{avg} \pi r^2$, where r is the inside radius of the meter Standard Flow Rate $Q_s = Q_a F_p F_t F_{pv}^2$ Where
$F_p = (P_s + P_{atm})/P_{atm}$
$F_t = 519.67/(F_t + 459.67)$
$F_{pv}^2$ = Compressibility ratio
$P_s$ = Static Pressure, Gauge
$T_f$ = Flowing Temperature, DegF Energy Flow Rate $Q_e = Q_s Hv$, where Hv is the heating value in Btu/1000 SCF
Average Fluid $C_{avg}$ = the average speed of sound of the fluid. The ultrasonic Speed of Sound meter applies a weighted average algorithm of the per path speed of sound measurements, $c_1 \ldots c_x$, to determine the $C_{avg}$. The invention calculates $C_{avg}$ via the AGA 10 calculation
Speed of Sound $C_x - C_y$ = a Path Speed of Sound Relationship, which includes all Relationships possible combinations of path speed of sound measurements $C_1 \ldots C_x$
Metrological Checksum Unique number calculated from the numbers comprising the portion of the ultrasonic meter's electronic configuration that effects flow measurement. The checksum is calculated by the meter
Response Factors Chromatograph response factors are a diagnostic produced by chromatographs—used to indicate the results of a calibration. A response factor is generated for each of the components that the chromatograph is designed to detect
Description FIG. 1 illustrates the invention's computer processor (20) connected via serial communications to a temperature sensor (30), pressure sensor (40), flow computer (70), ultrasonic meter (60) and gas chromatograph (50). The diagram shows the flow computer (70) connected to a temperature sensor (30) and a pressure sensor (40).

The flow computer (70) uses information from the ultrasonic meter (60), the chromatograph (50), the temperature sensor (30), and the pressure sensor (40) to calculate the compressibility ratio, flow rate and an energy rate. The invention processor (20) receives the same information and recalculates the compressibility ratio, the flow rate and the energy rate. The processor (20) also receives diagnostic information from the ultrasonic meter (60) and the chromatograph (50) and uses all the information to determine the performance of the system (10).

Figure 2:
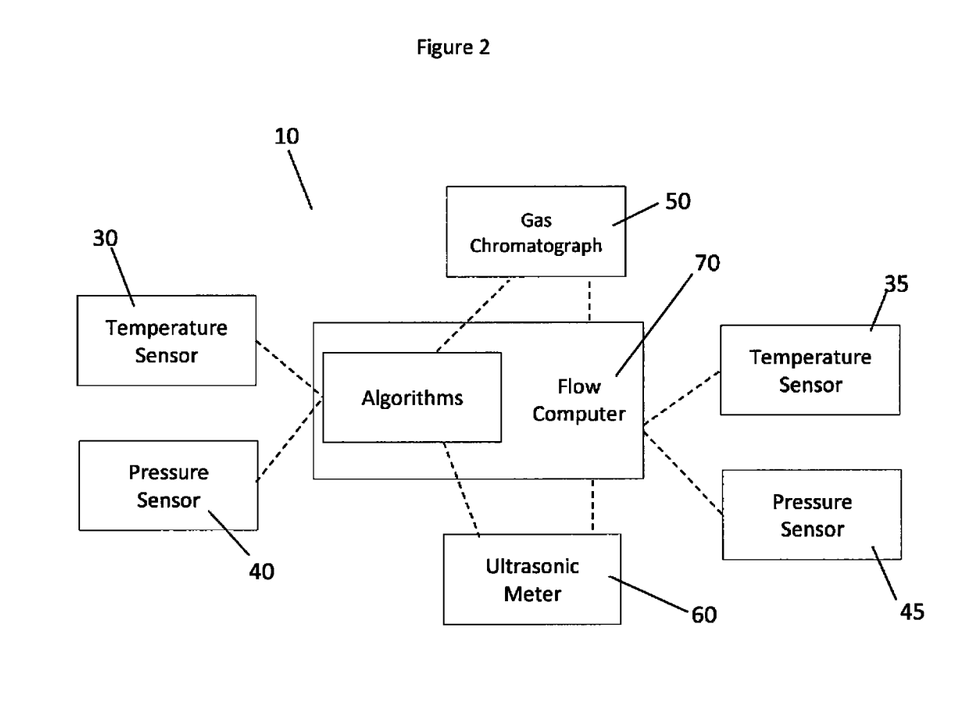
FIG. 2 is a schematic view of an integrated embodiment of the present invention.

FIG. 2 illustrates the invention's algorithms existing in a processor (20) within the flow computer (70). The flow computer (70) is connected via serial communications to a temperature sensor (30), pressure sensor (40), ultrasonic meter (60) and gas chromatograph (50). The diagram shows two temperature sensors (30, 35) and two pressure sensors (40, 45). The reading from one of the temperature sensors (30) and one of the pressure sensors (40) is used by the invention algorithms and is not needed for the flow computer (70).

The flow computer (70) uses information from the ultrasonic meter (60), the chromatograph (50), the temperature sensor (30), and the pressure sensor (40) to calculate the compressibility ratio, flow rate and an energy rate. The invention algorithms use the information and recalculate the compressibility ratio, the flow rate and the energy rate. The processor also receives diagnostic information from the ultrasonic meter (60) and the chromatograph (50) and uses all the information to determine the performance of the system (10).

Figure 3:
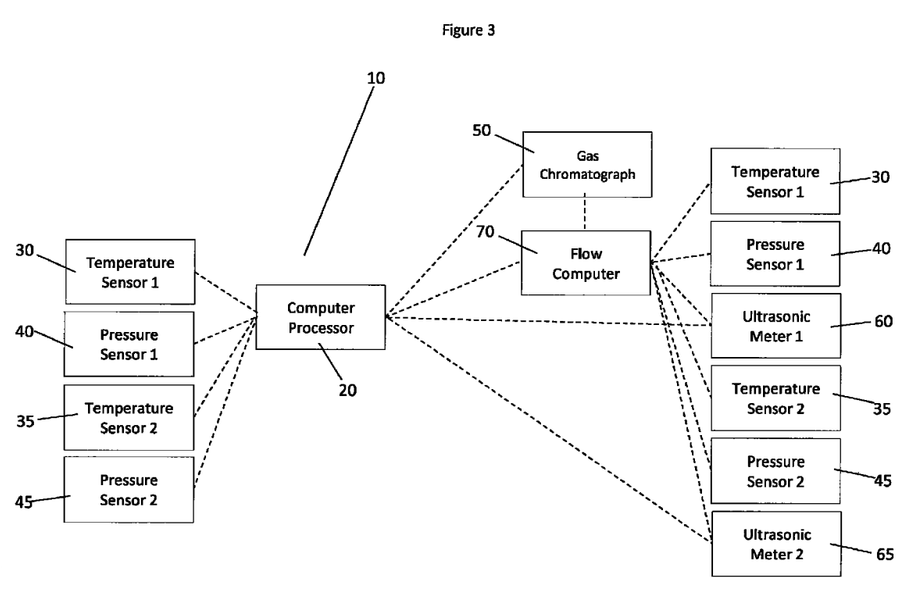
FIG. 3 is a schematic view of a stand-alone series or parallel embodiment of the present invention.

FIG. 3 illustrates the invention's computer processor (20) connected via serial communications to temperature sensors (30, 35), pressure sensors (40, 45), flow computer (70), ultrasonic meters (60, 65) and gas chromatograph (50). The diagram shows the flow computer (70) connected to the temperature sensors (30, 35) and the pressure sensors (40, 45).

The flow computer (70) uses information from the ultrasonic meters (60, 65), the chromatograph (50), the temperature sensors (30, 35), and the pressure sensors (40, 45) to calculate the compressibility ratio, flow rate and an energy rate through each of the ultrasonic meters (60, 65). The invention processor (20) receives the same information and recalculates the compressibility ratio, the flow rate and the energy rate. The processor (20) also receives diagnostic information from the ultrasonic meters (60, 65) and the chromatograph (50) and uses all the information to determine the performance of the system (10).

Ultrasonic meters measure the actual flow rate, $Q_a$, of a fluid by using an array of ultrasonic transducers and receivers that produce several fluid velocity measurements. Weighting and correction algorithms, which are stored in the electronic configuration of the meter, integrate the velocity measurements to produce an average fluid velocity, $V_{avg}$. The actual flow rate, $Q_a$, is the product of the average fluid velocity and the cross sectional area of the meter body.

The ultrasonic meter converts the flow rate, $Q_a$, to a digital output signal which is read as a digital input into the flow computer. The flow computer has sensors to measure the pressure, $P_s$, and temperature, $T_f$. The flow computer uses gas composition data to calculate the $F_{pv}^2$. The flow computer then calculates the standard flow rate, $Q_s$.

The monitoring system of the present invention polls the ultrasonic meter via Modus for the individual path velocities, $v_1, \ldots v_x$, and applies an algorithm developed from flow calibration data or historical data that approximates the average fluid velocity, $V_{avg}$, outputted by the meter. The monitoring system of the present invention monitors the difference between the meter outputted $V_{avg}$ and the system calculated $V_{avg}$.

The monitoring system of the present invention polls the ultrasonic meter via Modbus for the average fluid velocity, $V_{avg}$. The monitoring system of the present invention calculates the actual flow rate, $Q_a$, using the average fluid velocity from the meter and the meter radius, r, stored in the system. The monitoring system of the present invention monitors the difference between the actual flow rate received via Modbus communications from the meter and the system calculated actual flow rate.

The monitoring system of the present invention polls the ultrasonic meter via Modbus for the actual flow rate, $Q_a$, and polls the flow computer via Modbus communications for the actual flow rate, which it receives via the digital input from the ultrasonic meter. The difference between the flow rate registered in the meter and in the flow computer is monitored by the system.

The monitoring system of the present invention includes sensors to measure the static pressure, $P_s$, and the flowing temperature, $T_f$, of the fluid. The monitoring system of the present invention polls the flow computer via Modbus communications for the pressure and temperature measurements used in the standard flow rate calculation, $Q_s$. The monitoring system of the present invention monitors the difference in the pressure and temperature registered by the flow computer and the pressure and temperature measured by the system's pressure and temperature sensors.

The monitoring system of the present invention polls the flow computer via Modbus for the compressibility ratio of the fluid, $F_{pv}^2$. The monitoring system of the present invention polls either the flow computer or the gas chromatograph via Modbus for the gas composition of the fluid and using the pressure and temperature polled from the flow computer and the gas composition, calculates the compressibility ratio. The monitoring system of the present invention monitors the difference between the compressibility ratio calculated by the flow computer and the system.

The monitoring system of the present invention polls the flow computer via Modbus for the actual flow rate, pressure, temperature, and compressibility ratio as well as the standard flow rate, $Q_s$. The monitoring system of the present invention uses the information to recalculate $Q_s$. The monitoring system of the present invention monitors the difference between the flow computer calculated $Q_s$ and the system calculated $Q_s$.

The monitoring system of the present invention polls the gas chromatograph via Modbus for the Heating value and the flow computer for the standard flow rate and the energy flow rate. The monitoring system of the present invention multiplies the flow computer's standard flow rate by the heating value to calculate an energy flow rate. The monitoring system of the present invention monitors the difference between the flow computer $Q_e$ and the system calculated $Q_e$.

The monitoring system of the present invention polls the ultrasonic meter via Modbus for the average speed of sound, $C_{avg}$. The monitoring system of the present invention polls either the flow computer or the gas chromatograph via Modbus for the gas composition of the fluid and using the pressure and temperature polled from the flow computer and the gas composition, calculates the average speed of sound of the fluid. The monitoring system of the present invention monitors the difference between the meter reported average speed of sound and the system calculated average speed of sound.

The monitoring system of the present invention polls the ultrasonic meter for diagnostic information produced by the meter. This information is used to report on the health or performance of the meter as well as information about the fluid dynamics. The monitoring system of the present invention monitors path velocity ratios. The monitoring system of the present invention monitors path turbulence levels. The monitoring system of the present invention monitors path speed of sound relationships. The monitoring system of the present invention uses the path velocity ratios, path turbulence levels, and path speed of sound relationships, and the speed of sound difference (from point number 8) to detect conditions that cause measurement uncertainty, such as debris in the flowing stream, material deposits inside the meter, and two phase flow.

The monitoring system of the present invention polls the chromatograph for response factors. The monitoring system of the present invention monitors changes in response factors over time.

The monitoring system of the present invention polls the ultrasonic meter for the metrological checksum. The monitoring system of the present invention monitors the value of the metrological checksum for changes.

For metering configurations, where there are multiple ultrasonic meters arrayed either in parallel or series, the monitoring system of the present invention polls the ultrasonic meters via Modbus for the actual flow rates and monitors the difference between the flow rates.

For metering configurations, where there are multiple ultrasonic meters arrayed either in parallel or series, the monitoring system of the present invention polls the ultrasonic meters via Modbus for the speed of sound of the fluid and monitors the difference between the speed of sounds outputted by the meters.

The monitoring system of the present invention can be a stand alone system, or the monitoring system of the present invention can be integrated into the flow computer. If the monitoring system of the present invention is integrated into the flow computer, the system does not poll the flow computer for the information described above. Instead the algorithms of the monitoring system of the present invention are embedded in the flow computer; the flow computer polls the devices for the information; and the flow computer provides the memory locations to read the information for the monitoring system of the present invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

We claim:

1. An automated meter station monitoring system for a fluid comprising:
   a processor having algorithms for verifying performance of a fluid flow measurement system;
   a pressure sensor operatively connected to said processor, said pressure sensor measuring the pressure of the fluid;
   a temperature sensor operatively connected to said processor, said temperature sensor measuring the temperature of the fluid;
   a gas chromatograph operatively connected to said processor, said gas chromatograph monitoring changes in gas composition and chromatograph response factors of the fluid;
   an ultrasonic meter operatively connected to said processor, said ultrasonic meter making at least one measurement of the velocity of the fluid, speed of sound of the fluid, actual flow rate of the fluid, and meter diagnostics; and
   a flow computer operatively connected to said processor, said flow computer recording pressure of the fluid, recording temperature of the fluid, recording gas composition of the fluid, calculating compressibility ratio of the fluid, calculating standard flow rate of the fluid, and calculating energy flow rate of the fluid;

wherein the processor calculates at least one of the following parameters: velocity of the fluid, compressibility ratio of the fluid, actual flow rate of the fluid, standard flow rate of the fluid, speed of sound of the fluid, and energy flow rate of the fluid;

wherein the processor compares one or more of said parameters to one or more corresponding parameters measured by the ultrasonic meter or the flow computer or the gas chromatograph to verify the performance of the fluid flow measurement system;

wherein the processor calculates the energy flow rate of the fluid based on the standard flow rate calculated by the flow computer and a heating value measured by the gas chromatograph; and wherein the processor monitors a difference between the energy flow rate of the fluid calculated by the flow computer and the energy flow rate calculated by the processor.

2. The automated meter station monitoring system according to claim 1, wherein the ultrasonic meter comprises an array of ultrasonic transducers and receivers, said array of ultrasonic transducers and receivers producing fluid velocity measurements of the fluid and fluid speed of sound measurements of the fluid.

3. The automated meter station monitoring system according to claim 2, wherein the ultrasonic meter further comprises a digital output signal, said digital output signal being read as a digital input signal to the monitoring system.

4. The automated meter station monitoring system according to claim 1, further comprising a diagnostic alarm, said diagnostic alarm triggering an alarm based on a result of the comparison between one or more of the parameters calculated by the processor and one or more of the corresponding parameters measured by the ultrasonic meter or the flow computer.

5. The automated meter station monitoring system according to claim 4, further comprising a speed of sound alarm, said speed of sound alarm triggering an alarm based on a difference between the speed of sound of the fluid calculated by the processor and the speed of sound of the fluid measured by the ultrasonic meter.

6. The automated meter station monitoring system according to claim 5, further comprising a flow rate alarm, said flow rate alarm triggering an alarm based on a difference between the actual flow rate of the fluid calculated by the processor and the actual flow rate of the fluid measured by the ultrasonic meter, or a difference between the standard flow rate of the fluid calculated by the processor and the standard flow rate calculated by the flow computer.

7. The automated meter station monitoring system according to claim 6, further comprising a pressure alarm, said pressure alarm triggering an alarm based on a difference between the pressure of the fluid measured by the pressure sensor and the pressure of the fluid recorded by the flow computer.

8. The automated meter station monitoring system according to claim 7, further comprising a temperature alarm, said temperature alarm triggering an alarm based on a difference between the temperature of the fluid measured by the temperature sensor and the temperature of the fluid recorded by the flow computer.

9. The automated meter station monitoring system according to claim 1, wherein the ultrasonic meter measures multiple path velocities of the fluid, and an average velocity of the fluid;

wherein the processor calculates an average velocity of the fluid based on the multiple path velocities of the fluid measured by the ultrasonic meter; and wherein the processor monitors a difference between the average velocity of the fluid measured by the ultrasonic meter and the average velocity of the fluid calculated by the processor.

10. The automated meter station monitoring system according to claim 9, wherein the processor calculates an actual flow rate of the fluid by multiplying the average velocity of the fluid measured by the ultrasonic meter and a radius of the ultrasonic meter; and wherein the processor monitors a difference between the actual flow rate of the fluid measured by the ultrasonic meter and the actual flow rate calculated by the processor.

11. The automated meter station monitoring system according to claim 1, wherein the processor calculates the compressibility ratio of the fluid based on the gas composition of the fluid measured by the gas chromatograph, the temperature of the fluid measured by the temperatures sensor, and the pressure of the fluid measured by the pressure sensor; and wherein the processor monitors a difference between the compressibility ratio of the fluid calculated by the flow computer and the compressibility ratio calculated by the processor.

12. A method for automated monitoring of a fluid flow measurement system, the method comprising:

providing a processor having algorithms for verifying the performance of a fluid flow measurement system;

providing a pressure sensor operatively connected to said processor, said pressure sensor measuring the pressure of the fluid;

providing a temperature sensor operatively connected to said processor, said temperature sensor measuring the temperature of the fluid;

providing a gas chromatograph operatively connected to said processor, said gas chromatograph monitoring the gas composition of the fluid and the chromatograph calibration response factors;

providing an ultrasonic meter operatively connected to said processor, said ultrasonic meter making at least one measurement of the velocity of the fluid, speed of sound of the fluid, actual flow rate of the fluid, and meter diagnostics; and providing a flow computer operatively connected to said processor, said flow computer recording pressure of the fluid, recoding temperature of the fluid, and recording gas composition of the fluid;

calculating, by the flow computer, compressibility ratio of the fluid;

calculating, by the flow computer, actual flow rate and a standard flow rate of the fluid;

calculating, by the flow computer, energy rate of the fluid;

calculating, by the processor, at least one of the following parameters: velocity of the fluid, compressibility ratio of the fluid, actual flow rate of the fluid, standard flow rate of the fluid, speed of sound of the fluid, and energy flow rate of the fluid; and comparing, by the processor, one or more of said parameters to one or more corresponding parameters measured by the ultrasonic meter or the flow computer to verify the performance of the fluid flow measurement system;

calculating, by the processor, the energy flow rate of the fluid based on the standard flow rate calculated by the flow computer and a heating value measured by the gas chromatograph; and monitoring, by the processor, a difference between the energy flow rate of the fluid calculated by the flow computer and the energy flow rate calculated by the processor.

13. The method according to claim 12, further comprising:

polling the ultrasonic meter for individual path velocities of the fluid;

calculating, by the processor, a calculated average fluid velocity of the fluid from the ultrasonic meter using an algorithm; and monitoring a difference between an outputted fluid velocity of the fluid from the ultrasonic meter and the calculated average velocity of the fluid.

14. The method according to claim 12, further comprising:

polling the ultrasonic meter for an average fluid velocity of the fluid and the actual flow rate of the fluid;

calculating, by the processor, a calculated actual flow rate of the fluid using the average fluid velocity of the fluid from the ultrasonic meter and a meter diameter; and monitoring a difference between an actual flow rate of the fluid from the ultrasonic meter and the calculated actual flow rate of the fluid.

15. The method according to claim 12, further comprising:

polling the ultrasonic meter for an actual flow rate of the fluid; and monitoring a difference between the actual flow rate of the fluid registered in the ultrasonic meter and the actual flow rate calculated by the fluid in the flow computer.

16. The method according to claim 12, further comprising:

polling the flow computer for a pressure measurement used by the flow computer in the standard flow rate calculation of the fluid;

polling the flow computer for a temperature measurement used by the flow computer in the standard flow rate calculation of the fluid; and monitoring a difference between the pressure registered by the flow computer and the temperature registered by the flow computer compared to the pressure measured by the pressure sensor and the temperature measured by the temperature sensor recorded by the monitoring system.

17. The method according to claim 12, further comprising:

polling the gas chromatograph for the gas composition of the fluid;

polling the flow computer for a pressure of the fluid;

polling the flow computer for a temperature of the fluid;

wherein the calculating of the compressibility ratio by the processor comprises calculating the compressibility ration based on the pressure of the fluid, temperature of the fluid and gas composition of the fluid polled from the flow computer; and monitoring a difference between the compressibility ratio of the fluid calculated by the flow computer and the compressibility ratio of the fluid calculated by the processor.

18. The method according to claim 12, further comprising:

polling the flow computer for an actual flow rate of the fluid;

polling the flow computer for a pressure of the fluid;

polling the flow computer for a temperature of the fluid;

polling the flow computer for a compressibility ratio of the fluid;

polling the flow computer for a standard flow rate of the fluid;

recalculating, by the processor, a calculated standard flow rate of the fluid using pressure of the fluid, temperature of the fluid, compressibility ratio of the fluid and the actual flow rate of the fluid polled from the flow computer; and monitoring a difference between a standard flow rate of the fluid calculated by the flow computer and a calculated standard flow rate of the fluid calculated by the processor.

19. The method according to claim 12, further comprising:

polling the gas chromatograph for a heating value of the fluid;

polling the flow computer for a standard flow rate of the fluid;

polling the flow computer for an energy flow rate of the fluid;

calculating, by the processor, a calculated energy flow rate of the fluid by multiplying the standard flow rate of the fluid by the heating value of the fluid; and monitoring a difference between the calculated energy flow rate of the fluid by the flow computer and the energy flow rate of the fluid calculated by the processor.

20. The method according to claim 12, further comprising:

polling the ultrasonic meter for an average speed of sound of the fluid;

polling the gas chromatograph for a gas composition of the fluid;

polling the flow computer for a pressure of the fluid;

polling the flow computer for a temperature of the fluid;

calculating, by the processor, an average speed of sound of the fluid using the pressure of the fluid, temperature of the fluid and gas composition of the fluid; and monitoring a difference between the average speed of sound of the fluid reported by the ultrasonic meter and the speed of sound of the fluid calculated by the processor.

21. The method according to claim 12, further comprising:

polling the ultrasonic meter for diagnostic information, said diagnostic information for at least one ultrasonic path including gains, signal to noise ratio, percent of accepted pulses, turbulence, velocity of the fluid, and speed of sound of the fluid; and monitoring the diagnostics for at least one ultrasonic path including gains, signal to noise ratio, percent of accepted pulses, turbulence, velocity of the fluid, and speed of sound of the fluid, calculating velocity and speed of sound ratios, and monitoring the calculated ratios and relationships to detect conditions causing measurement uncertainty.

22. The method according to claim 12, further comprising:

polling the gas chromatograph for response factors; and monitoring changes in response factors over time.

23. The method according to claim 12, further comprising:
   polling the ultrasonic meter for a metrological checksum; and
   monitoring value of the metrological checksum for changes.

* * * * *